Feb. 20, 1951   J. FLANAGAN   2,542,647
DESK CALENDAR
Filed Oct. 4, 1947
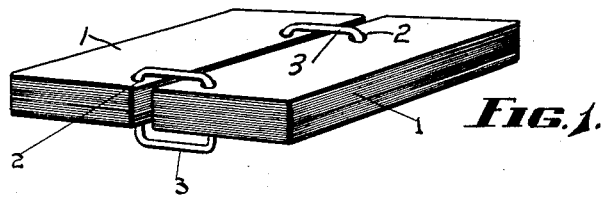
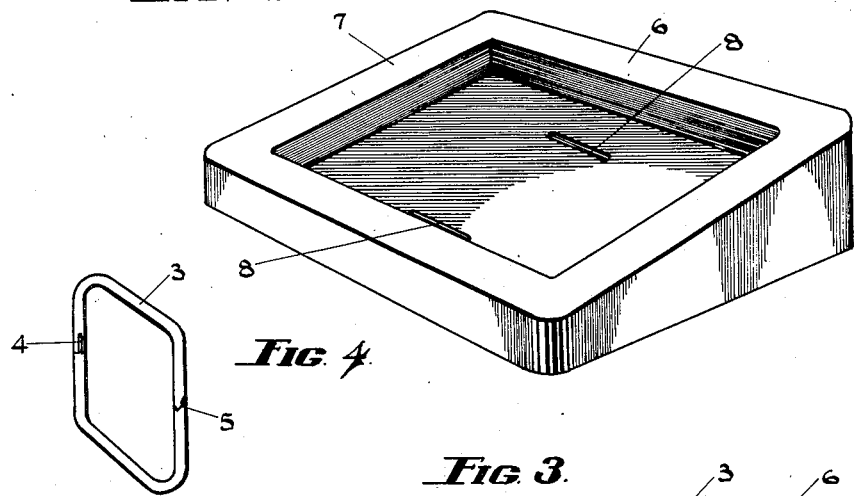
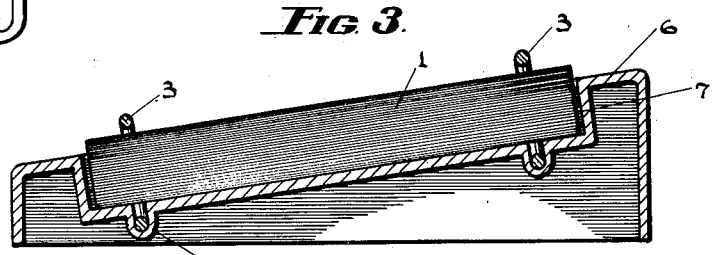
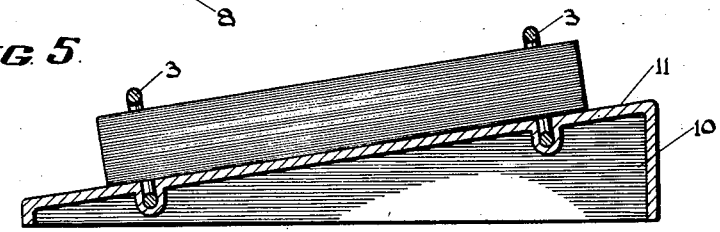
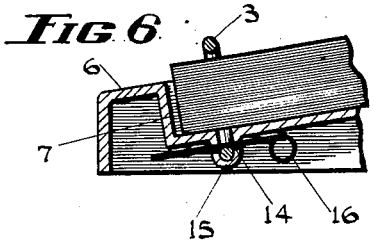
INVENTOR:
JOHN FLANAGAN
By Richardson, David and Nordon
Att'ys Patented Feb. 20, 1951

2,542,647

UNITED STATES PATENT OFFICE 2,542,647

DESK CALENDAR

John Flanagan, Maylands, South Australia, Australia, assignor to Twentieth Century Inventions Limited, Adelaide, South Australia, Australia, a company of South Australia Application October 4, 1947, Serial No. 777,967
In Australia November 25, 1946

3 Claims. (Cl. 40—120)

This invention relates to improvements in desk calendars or the like and in particular it relates to those having a series of leaves which are turned from one side to the other to display the days and dates and to give surfaces on which notes can be made for such days and dates.

With calendars or the like as constructed heretofore a difficulty has existed in that the block comprising the leaves has had a considerable depth, the two sides of which, that is the used and unused sides, varied in thickness excepting at about the middle of the year, this variation in thickness introducing difficulties in writing on the space provided particularly where the leaves are turned from one side to the other as opposed to up and down.

It is one object of this invention to overcome this difficulty and to provide an arrangement whereby the two parts of the block will be maintained approximately the same height throughout the period of use so that a relatively flat surface is at all times provided which will facilitate use and which will at the same time improve the appearance.

A further object is to provide a construction which will allow easier insertion and removal of the leaves or block when it is desired to replace same.

According to my invention the leaves may retain a construction similar to that previously used although the shape and perforations may be varied to suit the invention, but the holding means instead of comprising members which are secured to a base and on to which the leaves are threaded and on which they are turned from one position to the other, are so arranged that the leaves can be moved continuously around same to bring approximately the same number of leaves on each side of the holding means throughout the year.

In order however that the invention may be more clearly understood it will now be described with reference to the accompanying drawings in which:

Fig. 1 is a perspective view of a block of leaves joined by means of the endless holding means, Fig. 2 is a perspective view of a base in which the block of leaves shown in Fig. 1 are accommodated, Fig. 3 is a central longitudinal section of a calendar block as in use, Fig. 4 is a perspective view of one form of endless holding means, Fig. 5 is a view corresponding to Fig. 3 but showing a modified form of base, and Fig. 6 is a fragmentary view showing one form of locking means which may be used to hold the endless holding means in position.

A series of leaves 1 are provided with perforations 2 in any usual or approved manner through which the endless holding means 3 are located, the holding means being each provided with a hinge 4 whereby opening of the means is allowed and with inter-engaging clip means 5 to normally allow the holding means to be maintained in their closed position so that the leaves cannot be removed from same when the calendar is in use.

The base 6 has within it a recess 7 of a size to take the series of leaves 1 when opened out in the position shown in Fig. 1, the floor of the recess having in it depressions 8 in which the lower portions of the holding means are engaged, the depressions permitting the leaves to lie flat on the floor of the recess 7 and at the same time providing further alignment for the leaves in that the holding means are held in definite relationship with the base.

According to the modification shown in Fig. 5 the base 10 has a flat top 11 instead of having a recess 7 as shown in the earlier described embodiment, the alignment of the leaves 1 being then effected simply by the holding means 3.

In the modification shown in Fig. 6 locking means are included whereby the holding means 3 are held down in the depressions, the locking means comprising slots 14 through the projecting member 15 in which the depressions 8 are formed, actual locking being effected by means of a clip 16 which is moved through the slot 14 and which thus prevents the holding means 3 from being withdrawn from the depressions 8 until the clip 16 is withdrawn.

By means of this arrangement the calendar block or the like can at any time be divided into two sections of equal height, or approximately of equal height, the block with the holding members for same being simply lifted out of the support when it is desired to equalise the two sides, and the leaves of same being then swung around from one side to the other at the bottom of the pad.

When the base is recessed as shown in Fig. 2, the recess is preferably somewhat shallower than half the thickness of the block so that the upper surfaces of the two parts of the pad are lifted slightly above the surface of the block.

The construction among the other advantages allows much lower holding members to be used for the leaves of the pads as only one-half the height is held on any side as opposed to the need of accommodating the full height on each side in the previously used devices.

What I claim is:

1. A desk calendar comprising a series of leaves apertured near one edge and bearing calendar indicia and a writing space, endless holding means engaged through the apertures of the leaves to allow the leaves to be moved continuously around same, and a base to support the leaves in a divided position to have an approximately equal number of leaves on each side of the endless holding means and recessed to accommodate and align the leaves and further recessed to accommodate the lower portions of the endless holding means.

2. A desk calendar comprising a series of leaves apertured near one edge and bearing calendar indicia and a writing space, endless holding means engaged through the apertures of the leaves to allow the leaves to be moved continuously around same, a base to support the leaves in a divided position to have an approximately equal number of leaves on each side of the endless holding means and recessed to accommodate and align the leaves and further recessed to accommodate the lower portions of the endless holding means, and locking means between the endless holding means and the base.

3. A desk calendar comprising a series of leaves apertured near one edge and bearing calendar indicia and a writing space, endless holding means engaged through the apertures of the leaves to allow the leaves to be moved continuously around same, a displaceable portion on the holding means to allow the leaves to be positioned, a base to support the leaves in a divided position to have an approximately equal number of leaves on each side of the endless holding means and recessed to accommodate and align the leaves and further recessed to accommodate the lower portions of the endless holding means, and locking means between the endless holding means and the base.

JOHN FLANAGAN.

REFERENCES CITED

The following references are of record in the file of this patent:

UNITED STATES PATENTS

| Number | Name | Date |
|---|---|---|
| 74,509 | Crane | Feb. 18, 1868 |
| 185,139 | Schneider | Dec. 5, 1876 |
| 466,704 | Reily | Jan. 5, 1892 |
| 813,553 | Hale | Feb. 27, 1906 |
| 841,705 | Morden | Jan. 22, 1907 |
| 952,172 | Zimmer | Mar. 15, 1910 |
| 1,008,509 | Wilson | Nov. 14, 1911 |
| 1,187,484 | Bates | June 20, 1916 |
| 1,250,479 | Malysko | Dec. 18, 1917 |
| 1,379,132 | Smith | May 24, 1921 |
| 1,389,754 | Hale | Sept. 6, 1921 |
| 1,837,424 | Gannon | Dec. 22, 1931 |